Figure 1:
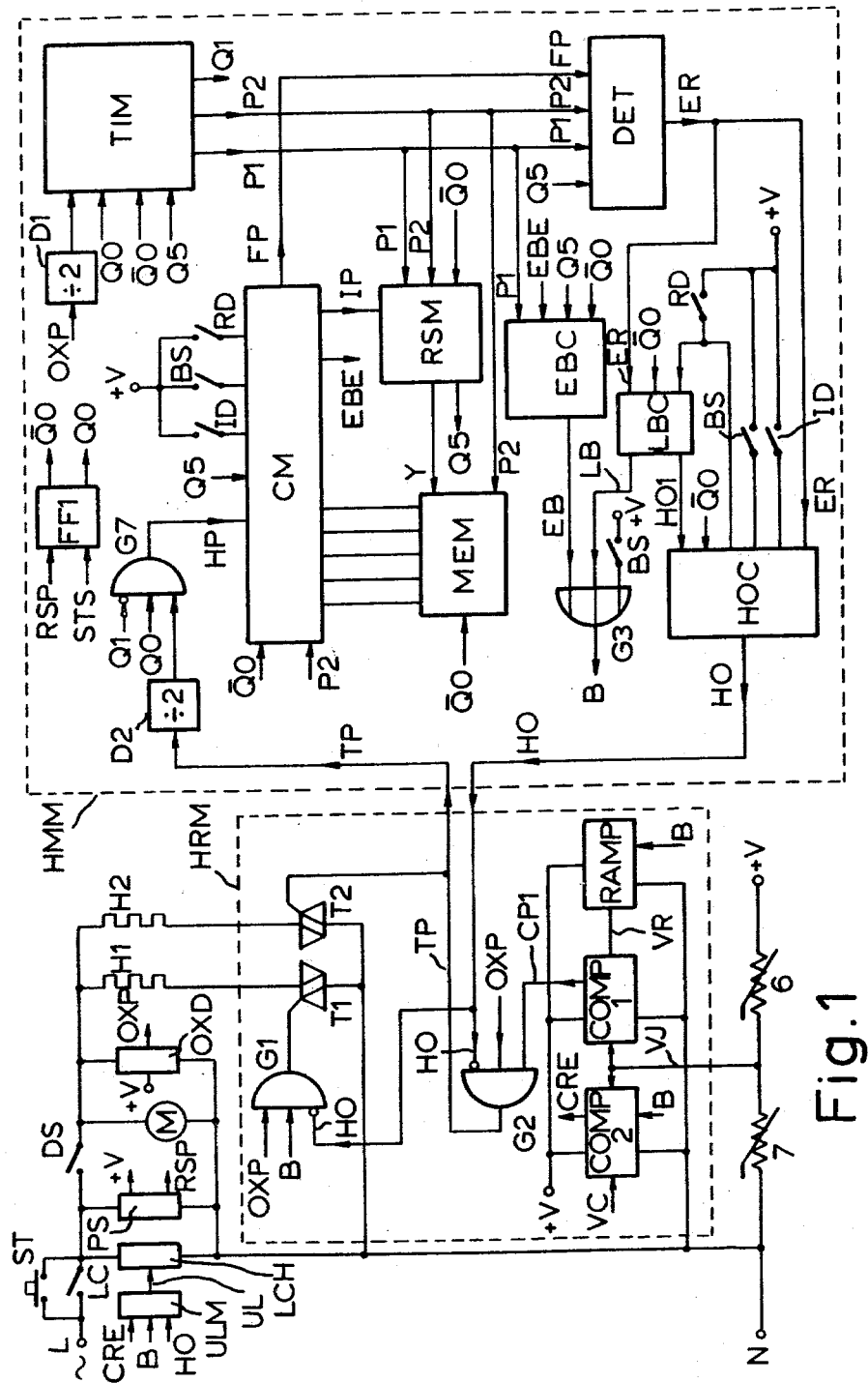

United States Patent [19]

Keuleman et al.

[11] 4,209,915
[45] Jul. 1, 1980

[54] CONTROL ARRANGEMENTS FOR CLOTHES DRIERS AND CLOTHES DRIERS INCLUDING SUCH CONTROL ARRANGEMENTS

[75] Inventors: Alexander H. F. Keuleman, Horley; David R. Hyde, South Croydon, both of England

[73] Assignee: U.S. Philips Corporation, New York, N.Y.

[21] Appl. No.: 892,864

[22] Filed: Apr. 3, 1978

[30] Foreign Application Priority Data

Apr. 5, 1977 [GB] United Kingdom ............... 14312/77

[51] Int. Cl.² .......................................... F26B 21/10
[52] U.S. Cl. .......................................... 34/48; 34/55; 328/48
[58] Field of Search .................. 34/45, 48, 55, 133; 328/48, 50

[56] References Cited

U.S. PATENT DOCUMENTS

| 3,471,937 | 10/1969 | Genbauffe | 34/45 |
| 3,702,030 | 11/1972 | Janke | 34/45 |
| 3,769,716 | 11/1973 | Janke et al. | 34/45 |
| 3,818,604 | 6/1974 | Offutt et al. | 34/55 |
| 3,944,841 | 3/1976 | Janke | 34/45 |
| 3,990,014 | 11/1976 | Hakozaki | 328/48 |

FOREIGN PATENT DOCUMENTS

| 2543763 | 7/1977 | Fed. Rep. of Germany |
| 1470163 | 4/1977 | United Kingdom |
| 1512265 | 5/1978 | United Kingdom |
| 1521532 | 8/1978 | United Kingdom |

Primary Examiner—Larry I. Schwartz
Attorney, Agent, or Firm—Thomas A. Briody; William J. Streeter; Bernard Franzblau

[57] ABSTRACT

A clothes drier control circuit includes an electric heater regulated to maintain a constant predetermined temperature difference between the outlet and the ambient air. A digital reference value is stored representing the constant heat output level when a constant rate of evaporation is reached. The eventual reduction of the heat output to a given fraction of the reference value is detected so as to indicate that the clothes have reached a predetermined desired degree of dryness.

12 Claims, 11 Drawing Figures

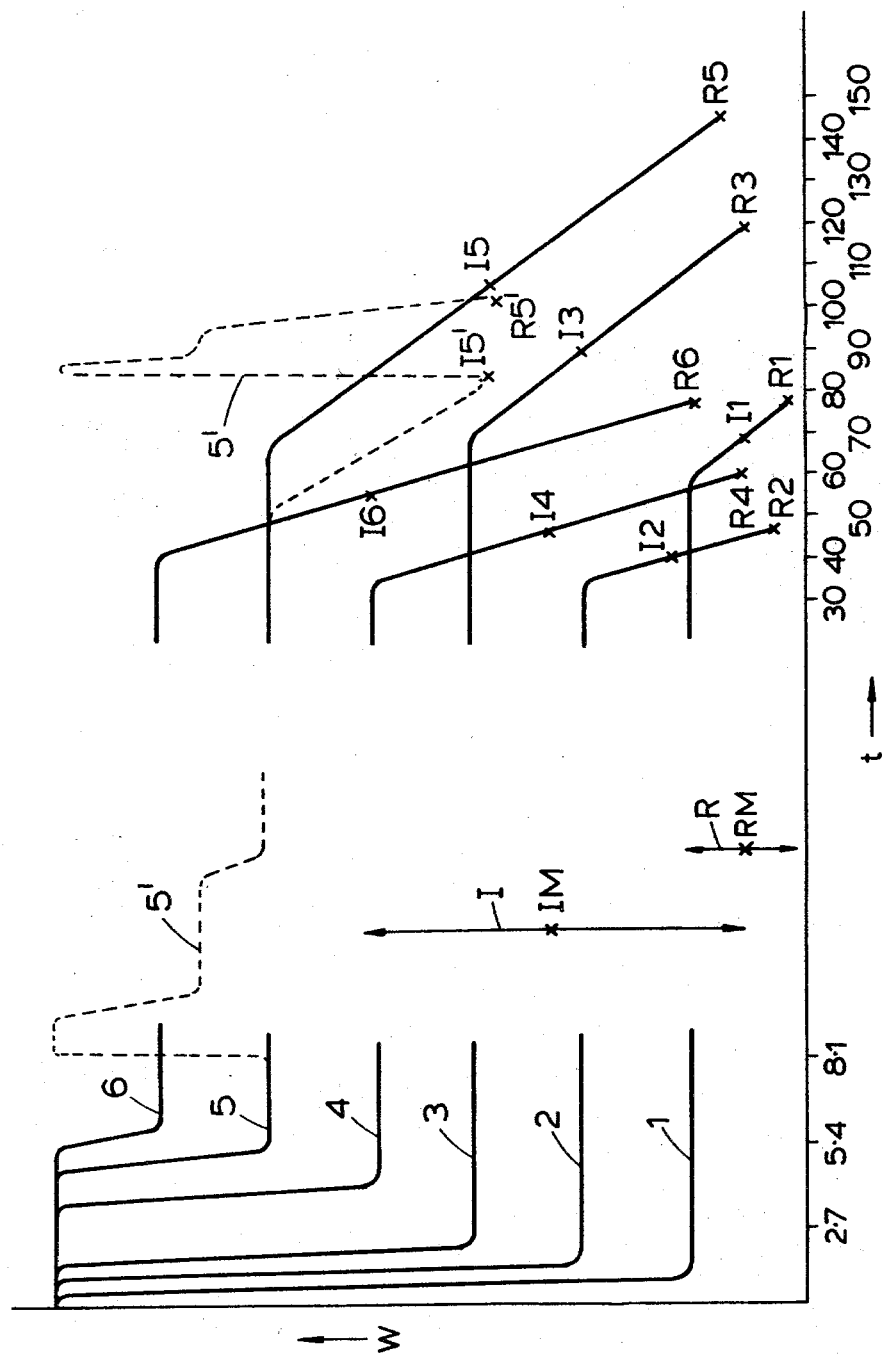

CONTROL ARRANGEMENTS FOR CLOTHES DRIERS AND CLOTHES DRIERS INCLUDING SUCH CONTROL ARRANGEMENTS

This invention relates to a control arrangement for a clothes drier having a drying chamber, means for passing air through the chamber from an inlet to an outlet, and heating means for heating the air adjacent said inlet; the control arrangement comprising a temperature sensor for location adjacent said outlet, heat regulating means for regulating the heat output of the heating means responsive to said temperature sensor, and means for monitoring the heat output of the heating means to switch off the heating means. The invention also relates to a clothes drier incorporating such a control arrangement.

A control arrangement of the type described in the preceding paragraph is disclosed in U.S. Pat. No. 3,471,937. In that the temperature sensor for location adjacent said outlet is a bulb containing expansible fluid. The heat regulating means is calibrated according to a selected value of the outlet air temperature and is connected to the temperature sensor so as to vary the output of the heating means to maintain the outlet air temperature substantially constant at the selected value. The inlet air temperature, i.e. the temperature of the air after it has been heated by the heating means and before it enters the chamber, is responsive to the heat output of the heating means. A graph shows the variation with time in the drying cycle of the inlet air temperature. The inlet air temperature rises to a value higher than the constant outlet temperature and then remains relatively constant at that higher value throughout the major portion of the drying cycle due to the relatively constant rate of evaporation of the moisture from the clothes. As the condition of the clothes approaches dryness the output of the heating means and hence the inlet air temperature starts to decrease. The means for monitoring the heat output of the heating means includes a further temperature sensor, which is also a bulb containing expansible fluid, for location adjacent the inlet so as to be responsive to the inlet air temperature. The means for monitoring the heat output of the heating means also includes means which is calibrated according to a selected value of the inlet air temperature and is connected to the further temperature sensor for switching off the heating means when the inlet air temperature reduces to the selected value. It is indicated that the selected value of the inlet temperature at which switch off of the heating means occurs may be adjusted by an operator control knob to control the degree of dryness of the clothes at which that switch off occurs.

We have found that, with a control arrangement of the type described in the opening paragraph, fixing an absolute value of the heat output at which the heating means is switched off for a given desired degree of dryness as taught by the above-mentioned U.S. Pat. No. 3,471,937 places a restriction on the accuracy with which that desired degree of dryness can be achieved. An object of the present invention is to improve the accuracy in this respect by removing this restriction.

According to the present invention there is provided a control arrangement of the type described in the opening paragraph, characterised in that the monitoring means includes means for producing electrical pulses such that the number of said pulses occuring in a given time interval is a predetermined function of the total heat output in that time interval, counting means for counting said pulses, means responsive to said counting means for selecting the commencement of a reference time interval of predetermined duration, storing means responsive to said counting means for storing a digital value which is a predetermined function of the number of said pulses occuring in said selected reference time interval, said number of pulses occuring in said reference time interval being a reference value, and detection means responsive to the stored digital value and responsive to the counting means for detecting when a drypoint time interval of predetermined duration occurs during which the number of said pulses is less than a predetermined proportion of said reference value, said predetermined proportion corresponding to a predetermined degree of dryness of the clothes.

According to the invention there is also provided a clothes drier having a drying chamber, means for passing air through the chamber from an inlet to an outlet, heating means for heating the air adjacent said inlet, and a control arrangement as described in the previous paragraph.

The invention is based on the following two properties of the control arrangement of the type described in the opening paragraph which we have found by experiment. The first property is that for a given outlet air temperature the relatively constant value of the heat output which is maintained responsive to that outlet air temperature during the major portion of the drying cycle due to the relatively constant rate of evaporation of the moisture from the clothes is dependent on the ambient conditions and the load for that particular drying cycle. That is to say that the value of the constant rate of evaporation, and hence the value of the constant heat output to maintain that constant rate of evaporation, depends on the humidity and the temperature of the ambient air passed into the drier and on the size of load. Thus for a given ambient air temperature and a given load, the constant rate of evaporation is lower if the humidity of the ambient air is higher; for a given ambient air humidity and a given load, the constant rate of evaporation is lower if the ambient air temperature is higher; and for a given humidity and temperature of the ambient air the constant rate of evaporation is higher if the size of the surface area of the load is larger. The second property is that when the condition of the clothes has approached dryness and the heat output is decreasing from the above-mentioned constant value, then the heat output measured as a predetermined proportion of that constant value corresponds with a predetermined degree of dryness of the clothes. The actual value of the proportion of the constant value which corresponds with a particular degree of dryness depends on the particular drier. Moreover there will be a certain tolerance on that value, for example if the constant value is higher then the clothes will be slightly drier for a given proportion of that constant value. However, the accuracy of the degree of dryness which can be detected for different loads and different ambient conditions with a control arrangement according to the invention is considerably improved compared with the above-mentioned known control arrangement which switches off the heating means at a fixed absolute value of the heat output for a given desired degree of dryness. That is to say that assuming that a given desired degree of dryness of the clothes does correspond to a fixed absolute value of heat output for a given load and given ambient conditions; then for a larger load the clothes would be more dry than desired when the heat output has reduced to that absolute value, and for higher ambient air humidity or temperature the clothes would be less dry than desired when the heat output has reduced to that absolute value. This particular disadvantage is avoided by the control arrangement according to the present invention.

The heat output of the heating means will not follow an absolutely smooth curve, and so the heat output is measured in the control arrangement according to the invention as the total heat output in suitably chosen time intervals.

The means for selecting the commencement of the reference time interval would ideally ensure that in every case, that is to say for all ambient conditions and all loads, the reference time interval occurs entirely within the part of the drying cycle wherein the heat output is constant so that the reference value coincides with that constant heat output value. This could be achieved by actually detecting when the heat output becomes relatively constant and selecting the commencement of the reference time interval responsive to that detection. However, we have found by experiment that for a particular drier, following switch-on of the drier the heat output of the heating means will start to reduce from its maximum value within a predetermined maximum time which will apply to well over 90% of the different loads and ambient conditions which that drier can be expected to encounter, and once the heat output starts to reduce it will relatively quickly reach the constant value. This can be taken advantage of by providing reference time interval commencement selection means which, according to a preferred feature of the invention, is responsive to said counting means for selecting the commencement of said reference time interval at a first predetermined time if the number of pulses occuring in a predetermined initial time interval is less than a predetermined initial number and for selecting the commencement of said reference time interval at a second, later, predetermined time if the number of pulses occuring in said predetermined initial time interval is not less than said predetermined initial number. In this case, for well over 90% of the drying cycles which are performed, the number of pulses which form the reference value will be a predetermined function of the heat output which is either the constant value for that cycle or which is only slightly higher than the constant value.

As has been mentioned above, we have found that for a given outlet air temperature the value of the relatively constant rate of evaporation of the moisture from the clothes during the major portion of the drying cycle is dependent on the ambient conditions and the load. It follows that for given ambient conditions and a given load, the value of that constant rate of evaporation is dependent on the value of the outlet air temperature. If the value of the outlet air temperature is high then the rate of evaporation will be high and so that drying cycle will be short. However, in addition to the power consumed by the evaporation process a large amount of power will be consumed during such a drying cycle in order to maintain that high outlet air temperature. A smaller amount of power will be consumed in a drying cycle if the outlet and ambient air temperature are closer together so that more of the power used during the major portion of the drying cycle is that consumed by the evaporation process. However in such a case the rate of evaporation will be low and so the drying cycle will be long. A compromise solution, according to another preferred feature of the invention, is to provide a control arrangement which is adapted for operation in an economy mode wherein the heat regulating means operates in a slow drying mode for part of the time before the heating means is switched off, said part of the time including said drypoint time interval, and wherein the heat regulating means operates in a fast drying mode for the remainder of the time before the heating means is switched off, said predetermined temperature difference being less than 5° C. in said slow mode and greater than 5° C. in said fast mode. Since ambient air temperature may vary by more than 5° C., it will be necessary in such a control arrangement for said temperature sensor to be a first temperature sensor, and for a second temperature sensor to be provided for location in air at ambient temperature, the heat regulating means then being responsive to said first and second sensors to maintain a predetermined temperature difference between the outlet and ambient air.

In a control arrangement adapted for economy mode operation as described in the preceding paragraph early boost control means may be provided responsive to the reference value, the heat regulating means being responsive to said early boost control means for operation in said fast mode during an early boost time interval after said reference time interval.

In a control arrangement adapted for economy mode operation as described in the penultimate paragraph, and possibly also as described in the preceding paragraph, late boost control means may be provided which are operative when selected by the user of the drier, the heat regulating means being responsive to the late boost control means when so selected for operation in said fast mode after detection of said drypoint time interval until the heating means is switched off. Such a late boost control means will be particularly advantageous in an arrangement where the user can select damp dry or room dry as the degree of dryness of the clothes at which the heating means is required to switch off. In this case selection of room dry can be made to effect the detection of said drypoint time interval at damp dry after which the fast mode is operated until switch off of the heating means.

Figure 2:
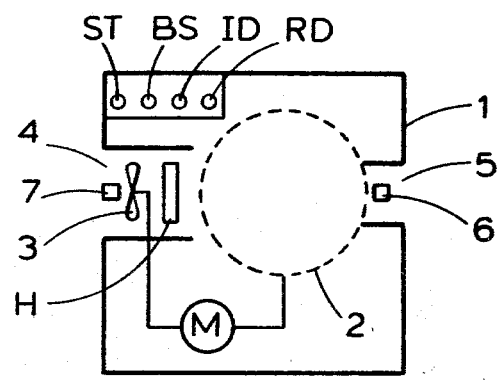
Figure 4:
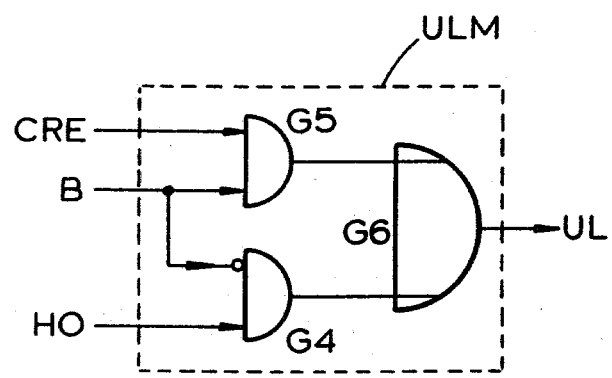

The invention will now be described in more detail with reference to the accompanying drawings, in which:

FIG. 1 shows a schematic circuit diagram of a control arrangement for a tumble drier, FIG. 2 shows a schematic diagram of a tumble drier incorporating the control arrangement of FIG. 1, FIG. 3 shows the variation with time of the power suppled to one of the heating elements shown in FIG. 1 for six typical drying cycles, FIG. 4 shows the detail of an unlatching module shown in FIG. 1, and FIGS. 5 to 11 show the details of the logic modules which form part of the heat monitoring means shown as part of the control arrangement of FIG. 1.

Referring now to FIG. 1, a latching device LCH is connected in series with a contact LC between the line terminal L and the neutral terminal N of an alternating voltage source, for example 240 volts r.m.s. at 50 Hz. Voltage is initially supplied to the latching device LCH by temporary closure, by the user of the drier, of a start button ST connected in parallel with the contact LC. The latching device, whose realisation will be apparent to those skilled in the art, is typically a relay whose operating coil is in series with a rectifying diode between the button ST and the terminal N. While the button ST is closed the coil effects closure of the contact LC and a holding capacitor connected in parallel with the coil is charged. Eventually a signal UL will be supplied from an unlatching module ULM (to be described in detail later) to turn on a transistor via which the holding capacitor will discharge and the contact LC will open to terminate operation of the control arrangement.

A power supply circuit PS is connected in series between the terminals L and N while the contact LC is closed. The circuit PS, whose realisation will be apparent to those skilled in the art, typically includes a rectifying diode, a voltage dropping resistor and a smoothing capacitor in series with the terminals L and N. The voltage across the smoothing capacitor is dropped by a further resistor and stabilised at a level +V volts by a zener diode. The circuit PS also includes a reset pulse circuit to produce a reset pulse RSP when operation of the control arrangement is initiated. The reset pulse circuit, whose realisation will be apparent to those skilled in the art, typically includes a resistor and further capacitor connected across the zener diode; a further zener diode and resistor connected across the further capacitor; and a transistor whose base electrode is connected to the further zener diode, and whose collector emitter path is connected in series with a resistor across the first zener diode. As the voltage across the first zener diode builds up towards +V the transistor collector voltage rises to a level which starts the reset pulse RSP, and then when the voltage across the further capacitor allows the further zener diode to conduct the transistor is turned off and the reset pulse RSP is terminated.

A motor M is connected in series between the terminals L and N while the contact LC is closed and while a door switch contact DS is closed by the user of the drier. Referring now to FIG. 2, the motor M is shown inside a clothes drier cabinet 1 and connected to rotate a drying chamber 2 and a fan 3. The fan 3 passes air through the chamber 2 from an inlet 4 to an outlet 5. A heater H is positioned adjacent the inlet 4 for heating the air before it enters the chamber 2. A first temperature sensor 6 is located adjacent the outlet 5. A second temperature sensor 7 is located adjacent the inlet 4 in air at ambient temperature, that is to say in air upstream of the fan 3 and the heater H.

Referring back to FIG. 1, the temperature sensors 6 and 7 are negative temperature coefficient resistors 6 and 7 connected in series between the voltage +V and the terminal N. The heater H consists of two electrical heating elements H1 and H2 which are each connected in series between the terminals L and N while the contacts LC and DS are closed. The output of the heating elements H1 and H2 is controlled by heat regulating means HRM which are responsive to the temperature sensitive resistors 6 and 7 to maintain a predetermined temperature difference between the outlet and ambient air.

A zero cross detector OXD is supplied with the voltage +V and, while contacts LC and DS are both closed, it is connected in series between the terminals L and N and produces zero crossing pulses OXP, that is to say pulses occuring at each zero crossing of the alternating voltage source applied to the terminals L and N. The zero cross detector OXD, whose realisation will be apparent to those skilled in the art, typically includes a first transistor whose collector-emitter path is connected via a resistor between the voltage +V and the terminal N, a second transistor whose collector-base path is connected via the resitor and a rectifying diode between the voltage +V and the terminal N, and a potential divider connected across the terminals L and N whose junction is connected to the base of the first transistor and to the emitter of the second transistor. For a portion of each half cycle of the alternating voltage around zero volts both transistors are turned off and the voltage at their collectors is substantially +V volts. For the remainder of each half cycle either the first transistor or the second transistor is conducting and the voltage at their collectors is substantially zero. The width of the zero crossing pulses thus produced is determined by the potential divider.

The heat regulating means HRM includes a triac T1 which is in series with the heating element H1 between the terminal L and N such that the heating element H1 is on when the triac T1 is turned on. The trigger electrode of the triac T1 is connected to the output of an AND gate G1 which passes zero crossing pulses OXP when enabled by the presence of a boost signal B and the absence of a heating off signal HO. The heat regulating means HRM also includes a triac T2 whose trigger electrode is connected to the output of an AND gate G2 which passes zero crossing pulses OXP, in the absence of the heating off signal HO, under the control of the output of a comparator COMP 1 which compares the potential VJ at the junction of the temperature sensor resistors 6 and 7 with a potential VR derived from a ramp generator RAMP.

Heat monitoring means HMM are responsive to the zero crossing pulses OXP which are passed by the AND gate G2, i.e. to trigger pulses TP, and thus to the heat output of the heating element H2 in order to eventually provide the heating off signal HO which disables the gates G1 and G2 and so turns off the heating elements H1 and H2.

The heat regulating means HRM and its operation will now be described in further detail. The comparator COMP 1, whose realisation will be apparent to those skilled in the art, typically includes a long tailed pair of transistors which are made operative to compare the potentials VJ and VR applied to their respective bases by a current source connected to their emitters. When the potential VR is higher than the potential VJ a respective one of the pair of transistors conducts and, via a suitable resistance, a high value potential is applied from the collector of that transistor as an enabling output signal CP1 from the comparator COMP 1 to the gate G2. When the potential VR is lower than the potential VJ that transistor does not conduct and a low value potential output signal from the comparator COMP 1 disables the gate G2. Thus while VR is higher than VJ the gate G2 is enabled and passes zero crossing pulses OXP as trigger pulses TP to maintain the triac T2 and hence the heating element H2 turned on. Suitably, the negative temperature coefficient resistors 6 and 7 are identical and so for a predetermined temperature difference between the outlet air and the ambient air the potential VJ has a known value. In this case, if it is desired to maintain this predetermined temperature difference by way of the heat regulating means HRM then the mean value of the potential VR will be set at this known value by connecting the respective input of the comparator COMP 1 to the junction of a potential divider consisting of two selected value resistors connected across the voltage +V and the terminal N within the ramp generator RAMP. The ramp generator RAMP, whose realisation will be apparent to those skilled in the art, typically further includes a resistor and capacitor connected across the voltage +V and the terminal N, a transistor connected across the capacitor and a Schmitt trigger circuit. The values of the resistor and the capacitor are such that the potential on the capacitor slowly charges up from a lower to a higher threshold value of the Schmitt trigger circuit over a ramp period which is many times the 20 millisecond period of the alternating voltage source applied to terminals L and N and is typically 10 seconds. When the potential on the capacitor reaches the higher threshold value the Schmitt trigger circuit turns on the transistor which rapidly discharges the capacitor; and when the potential on the capacitor reaches the lower threshold value the Schmitt trigger circuit turns the transistor off to allow the capacitor to recommence its slow charging. The ramp potential of the capacitor is applied via a ramp height determining resistor to the junction of the potential divider mentioned above. This ramp height determining resistor ensures that the potential VR at the junction of the potential divider varies during the ramp period over a range equivalent to a variation in the potential VJ produced by a predetermined change in the temperature difference between the outlet air and the inlet air. This predetermined change is typically 2° C. In this case the potential VJ will be lower than the potential VR for the whole of the ramp period and so the heating element H2 will be on all the time if the temperature difference between the outlet air and the ambient air is 1° C. below the predetermined temperature difference, and the potential VJ will be higher than the potential VR for the whole of the ramp period and so the heating element H2 will be off all the time if the temperature difference between the outlet air and the ambient air is 1° C. above the predetermined temperature difference. The heating element H2 will be on all the time at the beginning of the drying cycle and the heating element H2 would be off all the time at the end of a drying cycle in which the clothes were completely dry; otherwise during the drying cycle the proportion of each ramp period for which the heating element H2 is turned on varies so as to maintain the predetermined temperature difference between the outlet air and the ambient air within ±1° C. of the value set by the mean value of the potential VR. Thus the comparator COMP 1, the ramp generator RAMP and the gate G2 regulate the number of half cycles of the voltage source applied to the terminals L and N for which the triac T2 is turned on as a proportion of each ramp period, that is to say as a proportion of each successive fixed number of said half cycles which form a control period.

Referring now to FIG. 3, the variation with time t (plotted in minutes on the horizontal axis) of the power W supplied to the heater element H2 (plotted on the vertical axis) is shown for six typical drying cycles, all for a given control arrangement controlling a given tumble drier in the same ambient conditions, that is to say the same ambient air temperature and humidity. All six curves show the power supplied starting at its maximum value, then dropping to a relatively constant value for the major portion of the drying cycle due to a relatively constant rate of evaporation of moisture from the clothes, then decreasing as the clothes approach dryness. Curves 1, 3 and 5 relate to a light load, a medium load and a heavy load respectively when the control arrangement operates in a slow drying mode throughout the whole cycle. In such a slow drying mode the heat regulating means maintains a predetermined temperature difference between the outlet air temperature and the inlet air temperature less than 5° C. by setting the mean value of the ramp potential VR as has been described above with reference to FIG. 1. Curves 2, 4 and 6 relate to the same light load, medium load and heavy load respectively when the control arrangement operates in a fast drying mode throughout the whole cycle. In such a fast drying mode the heat regulating means maintains a predetermined temperature difference between the outlet air temperature and the inlet air temperature greater than 5° C., by setting the mean value of the ramp potential VR at a suitable value higher than for the slow drying mode.

Referring back to FIG. 1, a fast drying mode throughout the whole cycle is achieved by the user of the drier closing a contact BS and hence supplying a boost signal B from an OR gate G3 shown within the heat monitoring means HMM. The boost signal B is applied to the ramp generator RAMP wherein it turns on a transistor so as to add a resistor into the above-mentioned potential divider and hence sets the mean value of the ramp potential at the suitable value higher than for the low drying mode. The boost signal B is also applied to the AND gate G1 to enable the heating element H1 to be on for the whole of the drying cycle.

Referring back to FIG. 3, it can be seen that the relatively constant value of the power supplied to the heater element H2 in the slow drying mode is low for the light load (curve 1), higher for the medium load (curve 3) and higher still for the heavy load (curve 5). Also, for each type of load the relatively constant value of the power supplied to the heater element H2 in the fast drying mode (curves 2, 4 and 6) is greater than the relatively constant value in the slow drying mode. In the fast drying mode the heat supplied by the heating element H1 is nearly all used in maintaining the drier itself at the selected high temperature above ambient temperature and only a small amount of its output is used in maintaining the high temperature difference between the outlet air and the ambient air, and this is why the curves 2, 4 and 6 can be shown in their respective positions in FIG. 3 based on the output of the heating element H2. For each mode of drying the power supplied to the heating element H2 starts to decrease from the relatively constant value early for the light load, later for the medium load and later still for the heavy load. Furthermore, for each type of load the power supplied to the heating element H2 starts to decrease from its constant value earlier for the fast drying mode than for the slow drying mode.

We have found that, in each case, when the condition of the clothes has approached dryness and the power supplied to the heating element H2 is decreasing from its relatively constant value, then the power supplied to the heating element H2 measured as a predetermined proportion of that relatively constant value corresponds with a predetermined degree of dryness of the clothes. The actual value of the proportion of the constant value which corresponds with a particular degree of dryness depends on the particular drier. Moreover there will be a certain tolerance on that value, for example if the constant value is higher than the clothes will be slightly drier for a given proportion of that constant value. The constant value will be higher for a heavier load, or a higher predetermined temperature difference between the outlet air temperature and ambient air temperature, or a lower ambient air humidity. However, for a typical drier we have found that the power supplied to the heater element H2 starts to decrease when the degree of dryness of the clothes is at approximately 40% by weight of added water, that the clothes have approximately 25% by weight of added water (which is a suitable degree of dryness for ironing) when the power supplied to the heater element H2 is 60% of its constant value, and that the clothes have approximately 6% by weight of added water (which is room dryness) when the power supplied to the heater element H2 is 15% of its constant value. In accordance with these percentage values, FIG. 3 shows the points I1 to I6 on the curves 1 to 6 which mark the values of the power supplied to the heater element H2 and the times at which iron dryness is reached and FIG. 3 also shows the points R1 to R6 which mark the values of the power supplied to the heater element H2 and the times at which room dryness is reached. This shows a typical range of drying times from 40 minutes for a light load to reach iron dryness in a fast drying mode to 145 minutes for a heavy load to reach room dryness in a slow drying mode. The vertical line I shows the range of power W which covers the iron dry points I1 to I6, and the vertical line R shows the range of power W which covers the room dry points R1 to R6. The heat monitoring means HMM shown in FIG. 1 (whose realisation and operation will be described in detail later) ensures that for each of the curves 1 to 6 shown in FIG. 3 the heating elements H1 and H2 are switched off at the appropriate power level for iron dryness or room dryness as required by the user of the drier. FIG. 3 shows that if absolute values of heating power were chosen for switch-off of the heating means, for example the mean values IM and RM, then for light loads switch-off would occur when the clothes were too wet and for heavy loads switch-off would occur when the clothes were too dry. In particular, for light loads required to be iron dry switch-off could occur within the first five minutes of the drying cycle before the constant power level had been reached and when the clothes were almost completely wet.

Referring back to FIG. 1, the boost signal B is also applied as an enabling signal to the comparator COMP 2. The realisation of the comparator COMP 2 will be apparent to those skilled in the art and typically includes a long tailed pair of transistors and a current source, in this case gated by the boost signal B, in the same manner as the comparator COMP 1. The comparator COMP 2 compares the potential VJ at the junction of the temperature responsive resistors 6 and 7 with a fixed potential VC which is chosen such that the comparator COMP 2 provides an output signal CRE when the temperature difference between the outlet air and the ambient air is less than 5° C. Thus when the control arrangement has been operating in the fast drying mode the signal CRE will be provided when the clothes have cooled down sometime after the heating elements H1 and H2 have been switched off. The signal CRE is applied together with the boost signal B and the heating-off signal HO to the unlatching module ULM. FIG. 4 shows the details of the unlatching module ULM in which the boost signal B is applied as a disabling signal to the AND gate G4 and as an enabling signal to the AND gate G5. When the control arrangement has been operating in a slow drying mode, that is to say in the absence of the boost signal B, the heating off signal HO is passed by the AND gate G4 and, via the OR gate G6, provides a signal UL. When the control arrangement has been operating in a fast drying mode, that is to say in the presence of the boost signal B, the heating-off signal is not passed by the AND gate G4 but the signal CRE which is provided sometime later by the comparator COMP 2 is passed by the AND gate G5 and via the OR gate G6, provides the signal UL. Referring back to FIG. 1, as has been mentioned previously, the signal UL causes the latching device LCH to open the contact LC to stop the motor M and terminate operation of the control arrangement. Thus the comparator COMP 2 and the unlatching module ULM together provide cold run control means which are operative when the heating means is switched off and the temperature difference between the outlet air and the ambient air is greater than 5° C for continuing operation of the motor, and hence the fan which passes air through the drying chamber, until the outlet air temperature has reduced to a predetermined level.

Referring to FIG. 1, the heat monitoring means HMM will now be described in detail. Operation of the start button ST provides temporary rectified potential to a circuit (not shown) which provides a start signal STS to the reset input of a bistable circuit FF1 which thus provides an enabling signal Q0 to the timer TIM and to an AND gate G7. Within the time during which this start signal STS is present it is temporarily overriden by the reset pulse RSP provided by the power supply and applied to the set input of the bistable circuit FF1 which thus provides a coincident set pulse Q0 to various logic modules within the heat monitoring means, i.e. to a timer TIM, to counting means CM, to reference time interval selection means RSM, to storing means MEM, to early boost control means EBC, to late boost control means LBC and to heater-off control means HOC. Immediately after the pulse RSP the enabling signal Q0 is re-established and is then permanent. In response to the signal Q0 the timer TIM counts, via a divide-by-two circuit D1, alternate zero crossing pulses OXP produced by the zero cross detector OXD, i.e. it counts pulses at 50 Hz in the case where the alternating voltage source applied to the terminals L and N has a frequency of 50 Hz. When a predetermined number of pulses has been counted by the timer TIM, i.e. when a given time interval has elapsed, the timer TIM provides two successive output pulses P1 and P2 and then counting of the 50 Hz pulses is recommenced. The time interval measured by the timer TIM has one of two durations depending on the presence or absence of a signal Q5 derived from the reference time interval selection means RSM. During the time that the pulses P1 and P2 are produced an output signal Q1 is also provided by the timer TIM which disables the AND gate G7. Alternate trigger pulses TP supplied from the AND gate G2 to the triac T2 within the heat regulating means HRM are also provided via a divide-by-two circuit D2 to the AND gate G7 which passes them as heater pulses HP in the presence of the signal Q0 and in the absence of the signal Q1. Thus in each control period of the heat regulating means HRM, i.e. the ramp period of the ramp generator RAMP, the divide-by-two circuit D2 and the AND gate G7 are responsive to the number of half cycles in that control period for which the triac T2 is turned on to produce a proportional number of pulses HP. The divide-by-two circuit D2 and the AND gate G7 thus provide means for producing electrical pulses HP such that the number of pulses HP. The divide-by-two circuit D2 and the AND gate G7 thus provide means for producing electrical pulses HP such that the number of pulses HP occuring in a given time interval is a predetermined function of the total heat output of the heating means in that time interval.

The pulses HP are counted by the counting means CM. The reference time interval selection means RSM is responsive to the pulses P1 and P2 and to the presence or absence of a signal IP from the counting means CM to select a reference time interval of predetermined duration. The storage means MEM is responsive to the counting means CM and to an output pulse Y from the reference time interval selection means RSM to store a digital value which is a predetermined function of the number of pulses HP occuring in the selected reference time interval, the number of pulses HP occuring in the reference time interval being a reference value. The heat monitoring means HMM further includes detection means DET which is responsive to the pulses P1 and P2, to the signal Q5, and to a signal FP for detecting when a drypoint time interval of predetermined duration occurs during which the number of pulses HP is less than a predetermined proportion of said reference value. The signal FP is derived from the counting means CM which is responsive to the digital value stored in the storing means MEM. The reference value is a measure of the constant power supplied to the heating element H2 during the major portion of the drying cycle and hence detection of the just-mentioned drypoint time interval effectively detects when the clothes have reached a predetermined degree of dryness. This predetermined degree of dryness to be detected can be selected by the user of the drier by applying a potential +V to the counting means CM via a contact ID for iron dryness detection or via a contact RD for room dryness detection. The heater-off control means HOC is responsive to closure of the contacts RD, ID and BS by the user of the drier and is also responsive to an end of run pulse ER provided by the detection means DET and an output pulse HO1 provided by the late boost control means LBC to eventually provide the heating off signal HO to the heat regulating means HRM.

The heat output of the heating element H2 is measured as the total power supplied to it in suitably chosen time intervals because the power supplied to it will not follow an absolutely smooth curve. Referring back to FIG. 3, means for selecting the reference time interval would ideally ensure that in every case, that is to say for all ambient conditions and all loads, the reference time interval occurs entirely within the part of the drying cycle where the power supplied to the heating element H2 is constant so that the reference value coincides with that constant value. This could be achieved by actually detecting when the power supplied to the heating element H2 becomes relatively constant and selecting the reference time interval responsive to that selection. However, we have found by experiment that for a particular drier, following switch-on of the drier the power supplied to the heating element H2 will start to reduce from its maximum value within a predetermined maximum time which will apply to well over 90% of the different loads and ambient conditions which that drier can be expected to encounter, and once the heat output starts to reduce it will relatively quickly reach the constant value. FIG. 3 shows that for a typical drier this predetermined maximum time within which the power supplied to the heating element H2 starts to reduce is 5.4 minutes. This can be taken advantage of by arranging the reference time interval selection means RSM shown in FIG. 1 to be responsive to the counting means CM for selecting the reference time interval as a first predetermined reference time interval if the number of heater pulses HP occuring in a predetermined initial time interval is less than a predetermined initial number and for selecting the reference time interval as a second, later, predetermined, reference time interval if the number of heater pulses HP occuring in said predetermined initial time interval is not less than said predetermined initial number. Where the maximum time interval within which the power supplied to the heating element H2 starts to reduce is 5.4 minutes as shown in FIG. 3 the predetermined initial time interval is conveniently taken as half that maximum interval, i.e. 2.7 minutes. The number of alternate zero crossing pulses OXP supplied a 50 Hz to the timer TIM in 2.7 minutes is 8190. If the number of alternate trigger pulses TP supplied as heater pulses HP to the counting means CM in the initial time interval of 2.7 minutes is less than 8190 then the power supplied to the heating element H2 has started to reduce in that initial time interval of 2.7 minutes. In this case the first predetermined reference time interval selected by the reference time interval selection means RSM can be the time interval between 2.7 and 5.4 minutes and the number of heating pulses HP occuring between 2.7 and 5.4 minutes can be taken as a reference value. If the number of alternate trigger pulses TP supplied as heater pulses HP to the counting means CM in the initial time interval of 2.7 minutes is not less than 8190 then the power supplied to the heating element H2 has not started to reduce in that initial time interval of 2.7 minutes. However, it can be expected in this case that the power supplied to the heating element H2 will nevertheless have started to reduce within 5.4 minutes and so the second predetermined reference time interval selected by the reference time interval selection means RSM can be the time interval between 5.4 and 8.1 minutes and the number of heater pulses HP occuring between 5.4 and 8.1 minutes can be taken as the reference value. Thus for well over 90% of the drying cycles which are performed, the number of pulses which form the reference value will be a predetermined function of the heat output which is either the constant value for that cycle or which is only slightly higher than that constant value.

Figure 5:
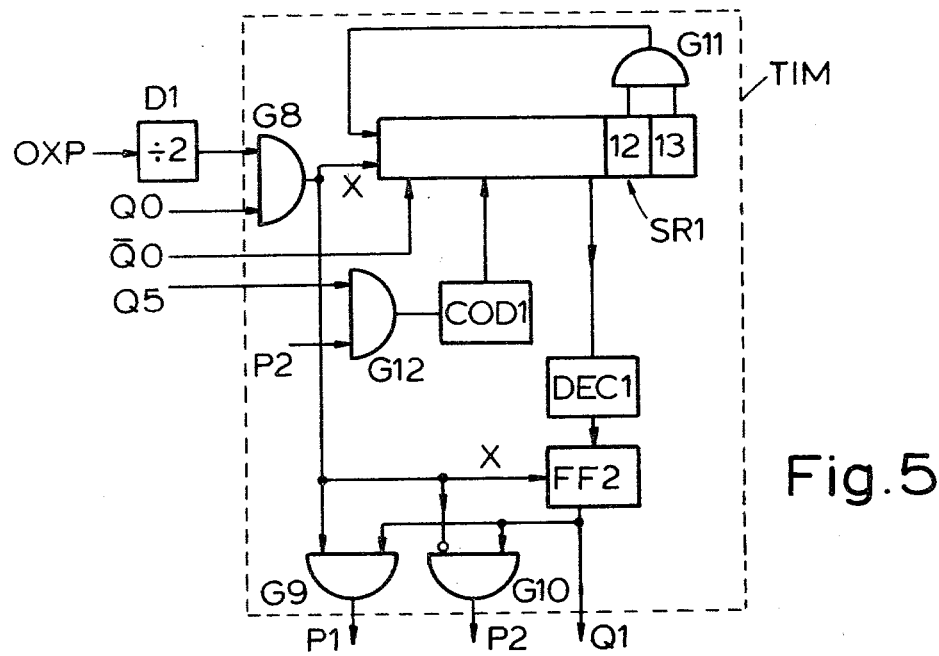

The timer TIM is shown in detail in FIG. 5. It consists essentially of a counter in the form of a 13 stage binary shift register SR1. At the beginning of the drier cycle the signal Q5 will be absent and the set signal Q0 sets the counter SR1 to zero. The following start signal Q0 enables an AND gate G8 to supply alternate zero crossing pulses OXP at 50 Hz as a pulse train X to the clock input of the counter SR1. The pulse train X is arranged to have an equal mark-to-space ratio. A decoder DEC1 connected to the stages of the counter SR1 detects when it has counted 8190 pulses, and during the 8190 mark period of the pulse train X an output signal from the decoder DEC1 primes the master-slave bistable circuit FF2. At the beginning of the 8191 mark period the bistable circuit FF2 is set to provide the output signal Q1 for the whole of the 8191 period. As has been previously mentioned, the signal Q1 disables the AND gate G7 (see FIG. 1). The signal Q1 is also applied as an enabling signal within the timer TIM to AND gate G9 and G10. The pulse train X is applied to an enabling input of the gate G9 and to a disabling input of the gate G10. Thus during the 8191 mark period AND gate G9 supplies the output pulse P1 and during the following 8191 space period the AND gate G10 supplies the output pulse P2. An AND gate G11 connected to stages 12 and 13 of the counter SR1 detects the 8191 count and applies a signal to the input to reset the counter SR1 to zero. The signal Q5 will still be absent and so the counter SR1 wil again count 8190 pulses (that is to say 2.7 minutes) and then produce the successive pulses P1 and P2 with an accompanying output signal O1. As will be explained in detail later, the signal Q5 will be produced as an output signal from the reference time interval selection means RSM either at the end of this second count of 8190 pulses (that is to say after an elapse of 5.4 minutes from switch on of the drier) or at the end of the third count of 8190 pulses (that is to say after an elapse of 8.1 minutes from switch on of the drier). Once the signal Q5 is produced it will remain present for the remainder of the drying cycle, and within the timer TIM it will enable an AND gate G12 to pass each pulse P2 to a coding circuit COD1 connected to the stages of the counter SR1 to preset the counter SR1 to a count of 1365 so that it will then produce the pulses P1 and P2 after each 6825 pulses of the pulse train X, i.e. at intervals of 2.3 minutes.

Figure 6:
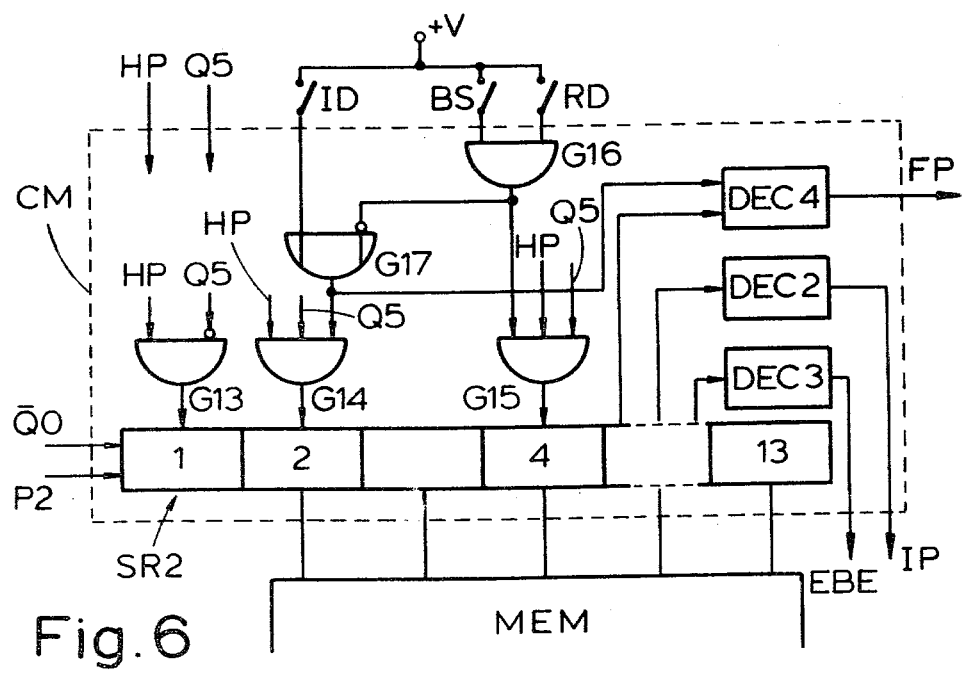

The counting means CM is shown in detail in FIG. 6. In the same manner as the time TIM it consists essentially of a counter in the form of a 13 stage binary shift register SR2. In the absence of the signal Q5 an AND gate G13 passes the heater pulses HP into the first stage of the counter SR2. In the presence of the signal Q5 the heater pulses HP will be passed by an AND gate G14 into the second stage of the counter SR2 or by an AND gate G15 into the fourth stage of the counter SR2. By means of an AND gate G16 and an OR gate G17, the closure of the iron dryness contact ID, or the closure of the room dryness contact RD without closure of the boost mode contact BS, by the user of the drier enables the AND gate G14; whereas the closure of the room dryness contact RD together with closure of the boost mode contact BS enables the AND gate G15. A decoder DEC2 connected to the counter SR2 provides an output signal IP if a count of 8190 is registered. A decoder DEC3 connected to the counter SR2 provides an output signal EBE if a count of 6142 is registered. A decoder DEC4 connected to the counter SR2 provides an output signal FP when stages 2 to 13 of the counter are all in the "1" state in the presence of an enabling output signal from the OR gate G17, or when stages 4 to 13 of the counter are all in the "1" state in the absence of an enabling output signal from the OR gate G17. The significance of the decoders DEC3 and DEC4 will be appreciated later when the early boost control means EBC and the detection means DET respectively are described in detail. Stages 2 to 13 of the counter SR2, which are all bistable circuits, are connected to the storing means MEM. Stage 1 of the counter SR2 is reset to the "0" condition by each pulse P2, and the significance of this will be explained later.

Figure 7:
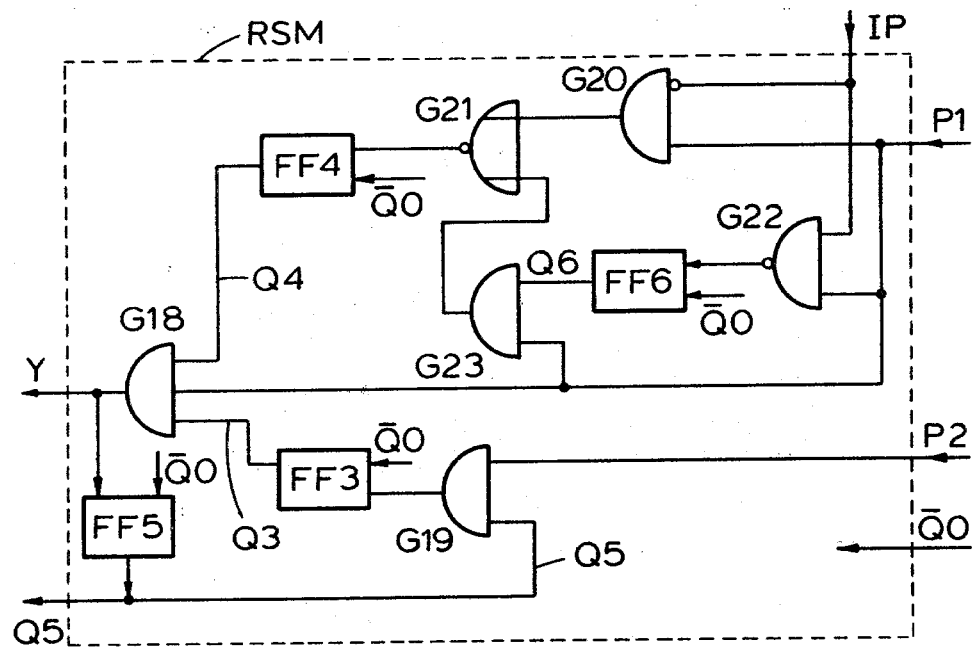

The reference time interval selection means RSM is shown in detail in FIG. 7. For a complete cycle of operation of the drier a single output pulse Y will be produced from an AND gate G18 which passes an output pulse P1 from the timer TIM when that gate is enabled from the outputs of bistable circuits FF3 and FF4. The enabling output Q3 from the bistable circuit FF3 is produced by the set pulse Q0 at the beginning of the drier cycle. If the power supplied to the heating element H2 has started to reduce in the initial time interval of 2.7 minutes then the output signal IP from the counting means CM will not be present coincident with the first pulse P1 at 2.7 minutes. In this case the enabling output Q4 from the bistable circuit FF4 is produced in response to the first pulse P1 at 2.7 minutes and so the second pulse P1 at 5.4 minutes is passed by the gate G18 as the pulse Y. If the power supplied to the heating element H2 has not started to reduce in the initial time interval of 2.7 minutes then the output signal IP from the counting means CM will be present coincident with the first pulse P1 at 2.7 minutes. In this case the enabling output Q4 from the bistable circuit FF4 is produced in response to the second pulse P1 at 5.4 minutes and so the third pulse P1 at 8.1 minutes is passed by the gate G18 as the pulse Y. The set pulse Q0 at the beginning of the drying cycle resets a bistable circuit FF5 so that the output signal Q5 therefrom is not present. When the Y pulse occurs coincident with either the second or the third pulse P1 the bistable circuit FF5 is set to produce the signal Q5 which is applied to the timer TIM. The signal Q5 also enables an AND gate G19 to pass the immediately following pulse P2 which resets the bistable circuit FF3 to remove the enabling signal Q3 and so disables the AND gate G18 from then on. The means for producing the enabling signal Q4 at the appropriate time will now be described in detail. It is assumed that the pulses P1 are positive going pulses. An absence of the signal IP at the time of the first pulse P1 enables that first pulse P1 to be passed by an AND gate G20 as a positive going pulse and by a NOR gate G21 as a negative going pulse. A presence of the signal IP at the time of the first pulse P1 ensures that that first pulse P1 is not passed by the AND gate G20. However, in this case, the first pulse P1 will be passed by a NAND gate G22 as a negative going pulse and the positive going edge at the end of this negative going pulse will set a bistable circuit FF6 (which was reset at the beginning of the drier cycle by the positive going edge at the start of the pulse Q0) to produce a signal Q6 which enables an AND gate G23. The second pulse P1 is then passed by the AND gate G23 as a positive going pulse and by the NOR gate G21 as a negative going pulse. The bistable circuit FF4 is reset by the positive going edge at the start of the pulse Q0 at the beginning of the drier cycle and is set to produce the enabling signal Q4 by the positive going edge at the end of the negative going pulse which is produced by the NOR gate G21 coincident with either the first or the second pulse P1.

Referring now back to FIGS. 1 and 6, the storing means MEM consists of twelve bistable circuits which are respectively connected to stages 2 to 13 of the counter SR2 within the counting means CM. At the beginning of the operation of the drier the set pulse Q0 resets all the bistable circuits of the storing means MEM to the "0" condition. Each pulse P2 produced by the timer TIM resets stage 1 of the counter SR2 to the "0" condition, as has been previously mentioned, and also transfers the condition of each of the bistable circuits of the storing means MEM into the respective stages 2 to 13 of the counter SR2. Thus when the timer TIM has counted 8190 pulses in the initial 2.7 minutes, then while the gate G7 is disabled by the signal Q1 during the 8191 period the first pulse P2 resets the counter SR2 to a count of zero. If the decoder DEC2 has not detected a count of 8190 in that initial period of 2.7 minutes and so has not provided a signal IP coincident with the first pulse P1 immediately preceding the first pulse P2, then the pulse Y will be produced by the reference time interval selection means RSM coincident with the second pulse P1 after 5.4 minutes. If the decoder DEC2 has detected a count of 8190 in that initial period of 2.7 minutes and so has provided a signal IP coincident with the first pulse P1 immediately preceding the first pulse P2, then the pulse Y will not be produced by the reference time interval selection means RSM coincident with the second pulse P1 and the immediately following second pulse P2 resets the counter to a count of zero. In this case the pulse Y will be produced by the reference time interval selection means coincident with the third pulse P1 after 8.1 minutes. In either case, the number of heater pulses HP entered into the counter SR2 in the 2.7 minutes immediately preceding the pulse Y will be the reference value. The pulse Y will transfer the complement of the condition of stages 2 to 13 of the counter SR2 into the storing means MEM and so the pulse P2 immediately following the pulse Y will transfer that complement back into stages 2 to 13 of the counter SR2. As has been previously mentioned in the description of the reference time interval selection means RSM with reference to FIG. 7, the signal Q5 is produced coincident with the pulse Y and remains present thereafter. As has been previously mentioned in the description of the timer TIM with reference to FIG. 5, the presence of the signal Q5 enables the pulses P2 to preset the count SR1 to a count of 1365 so that the pulses P2 are then produced at intervals of 2.3 minutes. Thus by means of the single pulse Y, the storing means MEM stores a digital value which is a predetermined function of the reference value, and that digital value is transferred into stages 2 to 13 of the counter SR2 by the pulse P2 immediately following the pulse Y and thereafter by the succeeding pulses P2 at intervals of 2.3 minutes.

Still referring to FIGS. 1 and 6 the presence of the signal Q5 enables the heater pulses HP occuring after the reference time interval and between the signals Q1 which disable the AND gate G7 to be passed by the AND gate G14 into the second stage or to be passed by the AND gate G15 into the fourth stage respectively of the counter SR2. If the heater pulses HP are fed into the second stage via the AND gate G14, then if 50% or more of the reference value number of heater pulses HP occurs in an interval of 2.3 minutes after a pulse P2 the counter SR2 will count those pulses from the digital value inserted into its stages 2 to 13 from the storing means MEM by the pulse P2 and the decoder DEC4 will detect a "1" condition in all the stages 2 to 13 and provide the signal FP before the next pulse P1. 50% or more of the reference value number of heater pulses HP occuring in a 2.3 minute interval after the reference time interval is equivalent to 60% or more of the reference value number of heater pulses HP which occured in the 2.7 minute reference time interval. If the heater pulses HP are fed into the fourth stage via the AND gate G15, then if 12½% or more of the reference value number of heater pulses HP occurs in an interval of 2.3 minutes after a pulse P2 the counter SR2 will count those pulses from the digital value inserted into its stages 4 to 13 from the storing means MEM by the pulse P2 and the decoder DEC4 will detect a "1" condition in all the stages 4 to 13 and provide a signal FP before the next pulse P1. 12½% or more of the reference value number of heater pulses HP occuring in a 2.3 minute interval after the reference time interval is equivalent to 15% or more of the reference value number of heater pulses HP which occurred in the 2.7 minute reference time interval.

Figure 8:
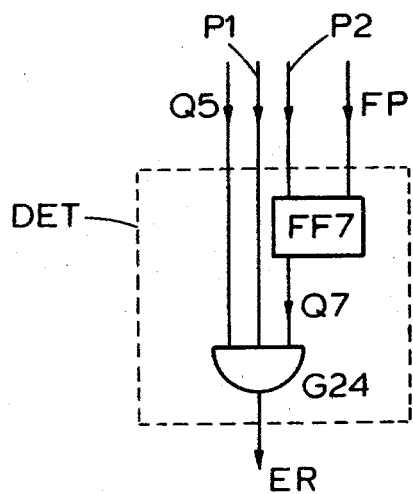

The detection means DET is shown in detail in FIG. 8. When the Y pulse occurs at the end of the reference time interval the signal Q5 first appears at a first input of an AND gate G24 and it remains there thereafter. The P2 pulse immediately following the Y pulse and each succeeding P2 pulse sets a bistable circuit FF7 which provides a signal Q7 to a second input of the AND gate G24. For so long as the signal FP is produced in each 2.3 minute interval thereafter the bistable circuit FF7 is reset and the signal Q7 is removed from the second input of the AND gate G24 before the next P1 pulse appears at the third input of the AND gate G24. A drypoint time interval of 2.3 minutes eventually occurs when the signal FP fails to appear before the P1 pulse at the end of that interval and so that P1 pulse is passed by the AND gate G24 as an end of run pulse ER. The failure of the signal FP to appear in the drypoint time interval indicates that the total power applied to the heating element H1 has reduced to below 60% of its reference value or has reduced to below 15% of its reference value according to whether the heater pulses HP have been applied to the second or fourth stage respectively of the counter SR2 in the counting means CM.

Figure 9:
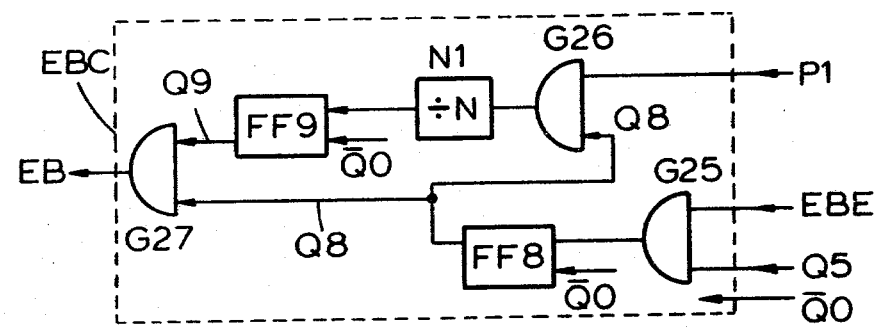

The early boost control means EBC shown in FIG. 1 is shown in detail in FIG. 9. At the beginning of the drier cycle the set signal Q0 resets bistable circuits FF8 and FF9 so that the signal Q8 is not present but the output Q9 is present. At the end of the reference time interval the signal Q5 enables an AND gate G25. If a heavy load is present then the heater pulses HP produced during the reference time interval will be more than some predetermined value and a pulse EBE will be produced. Referring back to FIG. 6 which shows the counting means CM, this predetermined value can be representative of 75% of the maximum output of the heater element H2 such that if the counter SR2 registers a count of 6142 this is detected by the decoder DEC3 to produce the pulse EBE. When the pulse EBE is passed by the AND gate G25 it sets the bistable circuit FF8 to produce the signal Q8 which is applied to enable an AND gate G26 and is passed by an AND gate G27 to provide the signal EB which will produce the boost signal B via the OR gate G3 shown in FIG. 1. The presence of the signal Q8 enables the AND gate G26 to pass the pulses P1 which appear at the end of each interval of 2.3 minutes after the reference time interval. When a predetermined number N of the pulses P1 have been applied to the divide-by-N circuit N1 it produces an output pulse which sets the bistable circuit FF9 to remove the signal Q9 and thereby disable the AND gate G27 to remove the signal EB. Thus, in the case where the user has not closed the boost switch contact BS to provide a permanent boost signal B from the OR gate G3 and where a heavy load is detected by the counting means CM, the early boost control means EBC effects a boost signal B from the OR gate G3 for a predetermined number N of time intervals each of 2.3 minutes immediately following the reference time interval. An example of the effect of the operation of the early boost control means EBC is shown by the dotted curve 5' shown in FIG. 3. Thus, after 8.1 minutes, the power applied to the heater element H2 rises to its maximum. After a while it reduces to a constant level higher than it would be in the unaffected slow drying mode. When the signal EB is removed the power applied to the heating element H2 drops to the slow drying mode constant level. The result of the early boost is that the clothes approach dryness and the power applied to the heating element H2 begins to reduce from its constant value earlier than it would otherwise do and the iron dryness level is detected at the point I5' which occurs approximately 20 minutes earlier than the point I5 when iron dryness would otherwise be detected.

Figure 10:
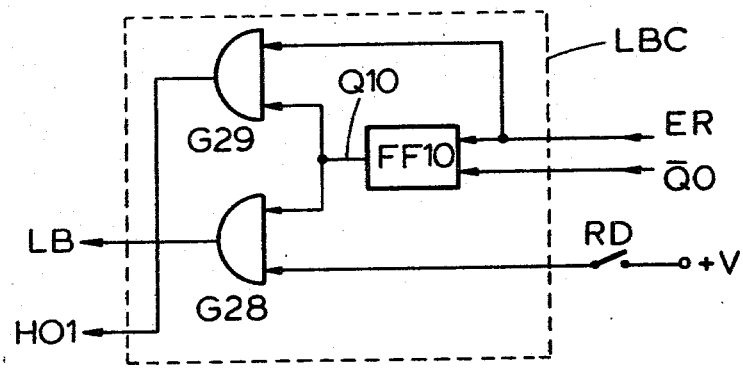

The late boost control means LBC shown in FIG. 1 is shown in detail in FIG. 10. Referring to FIG. 10 and also to the counting means CM shown in FIG. 6, if the user of the drier closes the room dryness selection contact RD but does not close the boost contact BS then the AND gate G14 is enabled via the OR gate G17 and the heater pulses HP enter stage 2 of the counter SR2 when the signal Q5 is present at the end of the reference time interval. Thus when the total power applied to the heating element H1 has reduced to below 60% of its reference value, that is to say when the clothes are at damp dryness, the decoder DEC4 fails to provide the signal FP and the detector DET provides a first end of run pulse ER. At the beginning of the drier cycle the set signal Q0 has reset a bistable circuit FF10 and the absence of the signal Q10 has disabled AND gates G28 and G29. The first end of run pulse ER sets the bistable circuit FF10 to provide the signal Q10. The signal Q10 is passed by the AND gate G28, the room dryness contact RD being closed, as a late boost signal LB which provides the boost signal B via the OR gate G3 shown in FIG. 1. In response to this boost signal B the power applied to the heater element H2 is raised to its maximum value. After a while it reduces to a level higher than the constant level of an unaffected slow drying mode and then it eventually reduces again to below 60% of its reference value when the detector DET provides a second end of run pulse ER. The signal Q10 produced by the first end of run pulse ER enables the AND gate G29 and so the second end of run pulse ER is passed by that gate as a pulse HO1 to the heater-off control means HOC shown in FIG. 1. An example of the effect of the operation of the late boost control means LBC is shown by the portion of the dotted curve 5' shown in FIG. 3 between the points I5' and R5', that is to say for a heavy load where the early boost control means EBC has also operated. The time interval between the points I5' and R5' is approximately 20 minutes. This is 20 minutes less than the 40 minute interval which would occur between the iron dryness point I5 and the room dryness point R5 without the operation of the late boost control means LBC. Thus if the user of the drier closes the room dryness contact RD without closing the boost contact BS the combined effect of the early boost control means EBC and the late boost control means LBC for a heavy load shown on curve 5 in FIG. 3 is that, although the drier operates in the slow drying mode for the middle portion of the cycle, the clothes reach room dryness after just over 100 minutes instead of after just over 140 minutes. If the user of the drier closes the boost contact BS then the drying cycle for the same heavy load follows curve 6 on FIG. 3, that is to say it operates in the fast drying mode for the whole time, and the room dryness point R6 is reached after just under 80 minutes.

Figure 11:
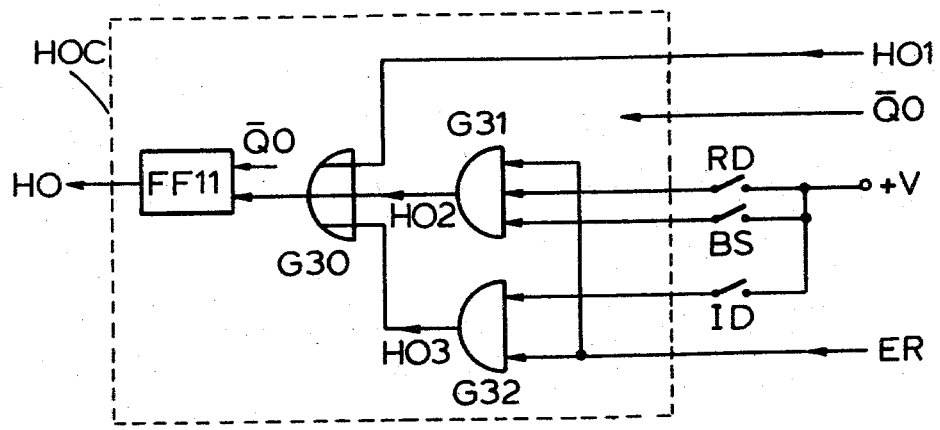

The heater-off control means HOC is shown in detail in FIG. 11. The set signal Q0 at the beginning of the drier cycle resets a bistable circuit FF11. The heater-off signal HO is provided by the bistable circuit FF11 when it is set, via an OR gate G30, by the pulse HO1 from the late boost control means LBC, or by a pulse HO2 from an AND gate G31, or by a pulse HO3 from an AND gate G32. If the user of the drier closes the room dryness contact RD and also closes the boost contact BS, then this enables the AND gate G31 to pass the first end of run pulse ER from the detector DET as the pulse HO2. In this case, referring back to FIG. 6, the AND gate G16 has enabled the AND gate G15 to pass the heater pulses HP into the Stage 4 of the counter SR2 and so the first end of run pulse ER is produced when the decoder DEC4 fails to produce the signal FP when the power supplied to the heater element H2 reduces to below 15% of its reference level. If the user of the drier closes the iron dryness contact ID then, whether or not the boost contact BS is closed, this enables the AND gate G32 to pass the first end of run pulse ER from the detector DET as the pulse HO3. In this case, referring back to FIG. 6, the OR gate G17 has enabled the AND gate G14 to pass the heater pulses HP into Stage 2 of the counter SR2 and so the first end of run pulse ER is produced when the decoder DEC4 fails to produce the signal FP when the power supplied to the heater element H2 reduces to below 60% of its reference level.

Some possible modifications, within the scope of the invention, of the control arrangement described above with reference to the drawings will now be discussed.

Both the early boost control means EBC and the late boost control means LBC are optional. That is to say that firstly the control arrangement can be modified so that if the user does not close the boost contact BS then there will be an early fast drying mode for heavy loads but the selection of room dryness will always result in a first end of run pulse ER being produced when the power applied to the heating element H2 has reduced to the appropriate 15% level. Secondly, the control arrangement can operate so that if the user does not close the boost contact BS then there will never be an early fast drying mode but a late fast drying mode will be incorporated to shorten the time taken from damp dryness detection to room dryness of the clothes. Thirdly, the control arrangement can exclude both the early boost control means EBC and the late boost control means LBC so that when the user of the drier does not close the boost contact BS the drier operates in the slow drying mode for the whole drying cycle. The three arrangements just mentioned and the arrangement described with reference to the drawings are all arrangements where the user of the drier has the choice of operating the drier in an economy mode or in a boost mode. The control arrangement could be further modified so that the user does not have this choice, that is to say it will operate only in an economy mode or otherwise only in a boost mode.

All the modifications mentioned in the preceding paragraph would result in a simplification of the control arrangement described with reference to the drawings and the nature of such simplification will be apparent without the need to describe it in any detail. However, it can be mentioned that in the case of a control arrangement which can only operate in a boost mode it is possible to choose a working temperature difference between the outlet air and the inlet air sufficiently large that the negative temperature coefficient resistor 7 which is responsive to the ambient air temperature can be replaced by a fixed resistor, that is to say that the heat regulating means HRM can operate responsive to an absolute outlet air temperature.

In the control arrangement described with reference to the drawings the storing means MEM, which stores a digital value which is a predetermined function of the number of heater pulses HP counted in the reference time interval, puts that digital value into the counting means CM at the beginning of each 2.3 minute time interval after the reference time interval. In an alternative arrangement the storing means MEM could be a first shift register for storing the reference value, and a second shift register could be provided for temporarily storing the number of heater pulses counted by the counting means in each 2.3 minute time interval. The contents of the two shift registers could then be compared in a short preselected time within each 2.3 minute time interval with the reference value being retained in the first shift register but the contents of the second shift register not being retained but rather replaced at the end of that 2.3 minute time interval. The comparison would be between the contents of one shift register and the contents of the other shift register relatively displaced by one or by three stages to detect the selected proportion of the reference value for iron dryness or room dryness.

In the control arrangement described with reference to the drawings the heater pulses HP are derived from the trigger pulses TP provided to the trigger electrode of the triac T2 which controls the heating element H2. In an alternative arrangement a temperature sensitive resistor could be located adjacent the air inlet of the drying chamber downstream from the heater, the resistance of that resistor thus being responsive to the heat output of the heater. This resistance could be arranged to control a voltage controlled oscillator such that the number of pulses produced by the voltage controlled oscillator in a given time interval is a function of the total heat output of the heating means in that time interval.

What we claim is:

1. A control arrangement for a clothes drier having a drying chamber, means for passing air through the chamber from an inlet to an outlet, and heating means for heating air adjacent said inlet; the control arrangement comprising a temperature sensor for location adjacent said outlet, heat regulating means for regulating the heat output of the heating means and responsive to said temperature sensor, and means for monitoring said heat output to switch off the heating means comprising means for producing electrical pulses such that the number of said pulses occuring in a given time interval is a predetermined function of the total said heat output in that time interval, means for counting said pulses, means responsive to said counting means for selecting the commencement of a reference time interval of predetermined duration, means responsive to said counting means for storing a digital value which is a predetermined function of the number of said pulses occuring in said selected reference time interval, said number of pulses occuring in said reference time interval being a reference value, and detection means responsive to the stored digital value and responsive to the counting means for detecting when a drypoint time interval of predetermined duration occurs during which the number of said pulses is less than a predetermined proportion of said reference value, said predetermined proportion corresponding to a predetermined degree of dryness of the clothes.

2. A control arrangement as claimed in claim 1 wherein the heating means includes an electrical heating element and the heat regulating means includes a solid state switch for connection in series with the heating element and an alternating voltage source, and in which the heat regulating means further includes means for regulating the number of half cycles of the voltage source for which the solid state switch is turned on as a proportion of each successive fixed number of said half cycles which form a control period.

3. A control arrangement as claimed in claim 2 wherein said means for producing electrical pulses is responsive to said number of half cycles in each control period for which the solid state switch is turned on to produce a proportional number of said electrical pulses in each control period.

4. A control arrangement as claimed in claims 1, 2 or 3, in which said reference time interval commencement selection means is responsive to said counting means for selecting the commencement of said reference time interval at a first predetermined time if the number of pulses occuring in a predetermined initial time interval is less than a predetermined initial number and for selecting the commencement of said reference time interval at a second, later, predetermined time if the number of pulses occuring in said predetermined initial time interval is not less than said predetermined initial number.

5. A control arrangement as claimed in claims 1, 2 or 3 wherein the detection means is responsive to a predetermined proportion of the stored digital value for a given said predetermined proportion of the reference value, and in which dryness selection means are provided operable by the user of the drier for adjusting said predetermined proportion of the stored digital value.

6. A control arrangement as claimed in claims 1, 2 or 3 wherein said temperature sensor comprises a first temperature sensor and further comprising a second temperature sensor for location in air at ambient temperature, and in which the heat regulating means is responsive to said first and second sensors to maintain a predetermined temperature difference between the outlet and ambient air.

7. A control arrangement as claimed in claim 6, adapted for operating in an economy mode wherein the heat regulating means operates in a slow drying mode for part of the time before the heating means is switched off, said part of the time including said drypoint time interval, and wherein the heat regulating means operates in a fast drying mode for the remainder of the time before the heating means is switched off, said predetermined temperature difference being less than 5° C. in said slow mode and greater than 5° C. in said fast mode.

8. A control arrangement as claimed in claim 7 further comprising early boost control means responsive to said reference value, and in which the heat regulating means is responsive to said early boost control means for operation in said fast mode during an early boost time interval after said reference time interval.

9. A control arrangement as claimed in claim 7 or claim 8 further comprising late boost control means operative when selected by the user of the drier, and in which the heat regulating means is responsive to the late boost control means when so selected for operation in said fast mode after detection of said drypoint time interval until the heating means is switched off.

10. A clothes drier having a drying chamber, means for passing air through the chamber from an inlet to an outlet, heating means for heating air adjacent said inlet, and a control arrangement a claimed in claims 1, 2 or 3.

11. In a clothes drier having a drying chamber with an air inlet and an air outlet, means for passing air through the chamber via said inlet and outlet, a temperature sensor located adjacent said outlet, and heating means for heating air flowing through said inlet, the improvement comprising a heat control system for the clothes drier comprising, means responsive to said temperature sensor for regulating the heat output of the heating means, said heat regulating means including switching means coupled to control the heating means and means responsive to the temperature sensor for deriving a train of pulses for controlling the on-off time of the switching means as a function of the outlet air temperature, and means responsive to said train of pulses for monitoring the heat output to switch off the switching means at a predetermined degree of dryness of the clothes in the drying chamber, said heat monitoring means comprising means for producing a number of electric pulses in a given time interval which is a predetermined function of the total heat output in said time interval, means for counting said electric pulses, means responsive to said counting means for selecting the start of a reference time interval of predetermined duration as a function of the number of pulses in said train of pulses that occur in a given initial time interval, storage means coupled to the counting means and to the selecting means for storing a digital reference value determined by the number of pulses that occur in the selected reference time interval, and detection means responsive to said counting means and to said selecting means for generating a control pulse to turn off the switching means at a time corresponding to said predetermined degree of dryness of the clothes.

12. A clothes drier as claimed in claim 11 wherein said selecting means includes logic means responsive to said counting means for selecting the start of said reference time interval at a first or second predetermined time determined by the number of pulses occurring in said given initial time interval, said second predetermined time being later than the first predetermined time.

* * * * *